(12) United States Patent
Yoon et al.

(10) Patent No.: US 7,378,023 B2
(45) Date of Patent: May 27, 2008

(54) METHOD OF IMPROVING MEMBRANE BIOREACTOR PERFORMANCE

(75) Inventors: Seong-Hoon Yoon, Naperville, IL (US); John H. Collins, Bloomingdale, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/520,543

(22) Filed: Sep. 13, 2006

(65) Prior Publication Data

US 2008/0060996 A1 Mar. 13, 2008

(51) Int. Cl.
*C02F 3/00* (2006.01)
(52) U.S. Cl. ...................... 210/620; 210/732
(58) Field of Classification Search ............... 210/620, 210/732
See application file for complete search history.

(56) References Cited

U.S. PATENT DOCUMENTS

| | | | | |
|---|---|---|---|---|
| 6,723,245 | B1 * | 4/2004 | Collins et al. | 210/614 |
| 6,872,312 | B1 * | 3/2005 | Shah et al. | 210/609 |
| 2005/0029174 | A1 * | 2/2005 | Collins | 210/143 |

OTHER PUBLICATIONS

Calvo et al., Abstract of "Behaviour of a nitrifying and denitrifying submerged filters in the treatment of urban wastewater," Current Studies of Biotechnology, 2001, vol. 2, pp. 175-181.

Higgins et al., "Understanding factors affecting polymer demand for conditioning and dewatering," Water Environment Research Foundation (Publication No. 01-CTS-1), 2006.

Lee et al., "Comparison of the Filtration Characteristics between Suspended and Attached Growth Microorganisms in Submerged Membrane Bioreactor," Water Research, 2001, vol. 35, No. 10, pp. 7-16.

Nagaoka et al., "Influence of bacterial extracellular polymers on the membrane separation activated sludge process," Water Science and Technology, 1996, vol. 34, No. 9, pp. 165-172.

Nagaoka et al., "Modeling of biofouling by extracellular polymers in a membrane separation activated sludge system,"Water Science and Technology, 1998, vol. 38, Nos. 4-5, pp. 497-504.

Yoon et al., "A novel flux enhancing method for membrane bioreactor (MBR) process using polymer," Proceedings of the International Conference On Membrane (ICOM), 2005b, Aug. 21-25, Seoul, Korea.

Yoon et al., "Effects of flux enhancing polymer on the characteristics of sludge in membrane bioreactor process," Water Science and Technology, 2005a, vol. 51, Nos. 6-7, pp. 151-157.

* cited by examiner

*Primary Examiner*—Chester T Barry
(74) *Attorney, Agent, or Firm*—Peter A. DiMattia; Michael B. Martin

(57) ABSTRACT

Cationic polymers having a molecular weight greater than about 200,000 can be added to the activated sludge in an MBR for industrial wastewater treatment for reasons, which include: conditioning the activated sludge; improving flux through a membrane in the MBR; reducing fouling of the of the membrane in the MBR; and reducing foaming of the activated sludge in the MBR.

17 Claims, 1 Drawing Sheet

METHOD OF IMPROVING MEMBRANE BIOREACTOR PERFORMANCE

FIELD OF THE INVENTION

This invention pertains to increasing the performance of a membrane bioreactor ("MBR") used for treating industrial wastewater through the addition of one or more high molecular weight cationic polymers to activated sludge in the MBR.

BACKGROUND

In MBR processes, membrane fouling has always been a significant issue limiting the hydraulic performance of the process. Due to membrane fouling, throughput from the MBR often decreases and more membrane is often required to compensate for the throughput loss.

Recently, research results (Nagaoka et al, 1996, 1998; Lee et al., 2002) have shown that one of the main causes of membrane fouling is biopolymer, which includes polysaccharides and proteins secreted by biomass grown in the activated sludge of the MBR.

Consequently, methods of using cationic polymers that do not react with the negatively charged membranes in contact with the activated sludge were developed (Collins and Salmen, 2004; Collins et al., 2005). In this method, various polymers are directly added to the MBR activated sludge and react with the biopolymers. The resulting particles, which consist of biopolymers and synthetic cationic polymers, do not foul the membrane surface.

Though these methods have been successfully implemented in most MBRs it has been observed that some sludges, especially industrial sludges, did not always coagulate well when low molecular weight water soluble cationic polymers were used. Therefore, there is a need for a more efficacious way of coagulating industrial sludges.

SUMMARY OF THE INVENTION

The present invention provides for a method of conditioning an activated sludge in an MBR that treats industrial wastewater comprising: adding an effective amount of one or more cationic polymers that have a molecular weight greater than about 200,000 daltons to an activated sludge of the MBR.

The present invention also provides for a method of improving flux through a membrane in the MBR that treats industrial wastewater comprising: adding an effective amount of one or more cationic polymers that have a molecular weight of greater than about 200,000 daltons to an activated sludge of the MBR.

The present invention also provides for a method of reducing foaming in an MBR that treats industrial wastewater comprising: adding an effective amount of one or more cationic polymers that have a molecular weight of greater than about 200,000 daltons to an activated sludge of the MBR.

The present invention also provides for a method of reducing fouling in a membrane of an MBR that treats industrial wastewater comprising: adding an effective amount of one or more cationic polymers that have a molecular weight of greater than about 200,000 daltons to an activated sludge of said MBR.

DETAILED DESCRIPTION OF THE INVENTION

Figure 1:
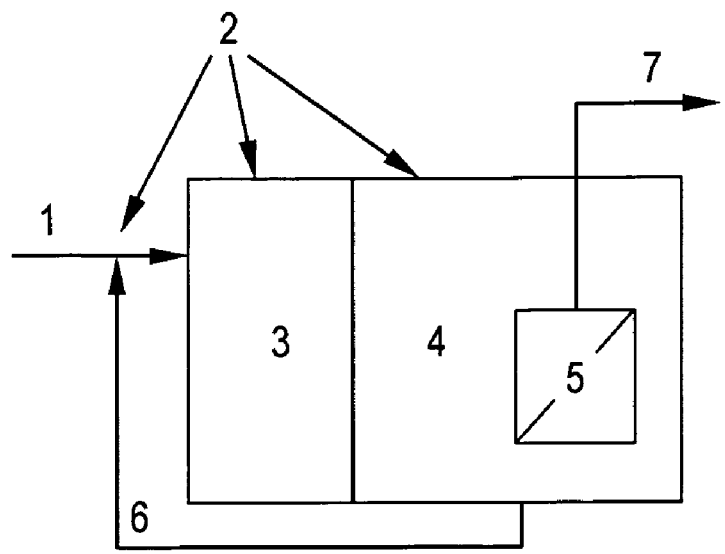
FIG. 1 shows a schematic of a membrane bioreactor containing a submerged membrane.

Definitions of Terms:

"MBR" means membrane bioreactor.

"Mixed Liquor" or "activated sludge" means a mixture of wastewater, microorganisms used to degrade organic materials in the wastewater, organic-containing material derived from cellular species, cellular by-products and/or waste products, or cellular debris. Mixed liquor can also contain colloidal and particulate material (i.e. biomass/biosolids) and/or soluble molecules or biopolymers (i.e. polysaccharides, proteins, etc.).

"Mixed liquor suspended solids" ("MLSS") means the concentration of biomass which is treating organic material, in the mixed liquor.

"COD" means chemical oxygen demand.

"Conditioning" means precipitating soluble biopolymer and coagulating and flocculating the particulate and colloidal organic material in the mixed liquor to form larger aggregates of particles, resulting in an increase in flux through the membrane bioreactor filtration membrane and a reduction of fouling of the membrane.

"Industrial wastewater" means one or more of the following categories: wastewater occurring in manufacturing plants such as food, chemical, pharmaceutical, pulp/paper, refinery, machinery, electronics, etc. irrespective of its COD; average total COD including the effect of suspended solids is higher than 500 mg/L; TKN (Total Kjeldahl Nitrogen) including ammonia nitrogen and organic nitrogen) is less than 5% of total COD in raw wastewater; TP (Total phosphorous) content is less than 1% of COD; leachate from landfills; municipal wastewater content less than 50%; $COD/BOD_5$ ratio is over 1.5; and conductivity is over 1000 μS/cm.

As used herein, the following abbreviations and terms have the following meanings: "DADMAC" means diallyldimethyl ammonium chloride; DMAEA/MCQ means dimethylaminoethylacrylate methyl chloride quaternary salt; DMAEA/BCQ means dimethylaminoethylacrylate benzyl chloride quaternary salt; DMAEM/MCQ means dimethylaminoethylmethacrylate methyl chloride quaternary salt; and DMAEM/BCQ means dimethylaminoethylmethacrylate benzyl chloride quaternary salt.

"Cationic polymer" means a polymer having an overall positive charge. The cationic polymers of this invention include polymers composed entirely of cationic monomers and polymers composed of cationic and nonionic monomers and polymers composed of cationic and anionic monomers. Cationic polymers also include condensation polymers of epichlorohydrin and a dialkyl monoamine or polyamine and condensation polymers of ethylenedichloride and ammonia or formaldehyde and an amine salt. Cationic polymers of this invention include solution polymers, emulsion polymers, dispersion polymers and structurally modified polymers as described in PCT US01/10867.

"Cationic monomer" means a monomer which possesses a net positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylactylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl, methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride. Alkyl groups are generally $C_{1-4}$ alkyl.

"Nonionic monomer" means a monomer which is electrically neutral. Representative nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2)-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl(meth)acrylate, 2-hydroxypropyl(meth)acrylate, vinyl methylsulfone, vinyl acetate, glycidyl(meth)acrylate, and the like.

"Anionic monomer" means a monomer as defined herein which possesses a negative charge above a certain pH range. Representative anionic monomers include acrylic acid, and it's salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including, but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

PREFERRED EMBODIMENTS

As stated above, cationic polymers having a molecular weight greater than about 200,000 can be added to the activated sludge in an MBR for industrial wastewater treatment for reasons, which include: conditioning the activated sludge; improving flux through a membrane in the MBR; reducing fouling of the of the membrane in the MBR; and reducing foaming of the activated sludge in the MBR.

Various amounts and types of cationic polymers can be added to the activated sludge.

In one embodiment, an effective amount of cationic polymers is from about 3 to about 500 mg/L as actives.

In another embodiment, cationic polymers contain monomers selected from the group consisting of: dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylactylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl, methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, and diallyldimethyl ammonium chloride.

In another embodiment, the cationic polymers are selected from the group consisting of: DMAEA/MCQ; DMAEA/BCQ; DMAEM/MCQ; DMAEM/BCQ; and polymers utilizing mannich reactions.

The cationic polymers utilized to treat the industrial wastewater may have various cationic charges. In one embodiment, the cationic polymers have a net cationic charge that ranges from about 5% to about 100% based on the number of monomers in said cationic polymers.

The MBR may be further treated by adding an effective amount of one or more divalent ions, one or more trivalent ions, or a combination thereof to the activated sludge in the MBR. The ions may be added to the sludge in various chemical forms. Typically, these ions are added to an activated sludge having a pH of about 6 to about 8. If the pH varies from this range, caustic and or lime can be used to adjust pH back in this range.

In one embodiment, the divalent ion is selected from the group consisting of: Ca; and Mg. In a further embodiment, the Ca ion is added as a compound selected from the group consisting of: $CaCl_2$; $Ca(OH)_2$; $Ca(C_2H_3O_2)_2$; CaO; and hydrates thereof.

In another embodiment, the Mg ion is added as a compound selected from the group consisting of: $MgCl_2$; $Mg(OH)_2$; $Mg(C_2H_3O_2)_2$; $MgSO_4$; MgO; and hydrates thereof.

In yet a further embodiment the effective amount of divalent ion is from about 10 to about 500 mg/l.

In another embodiment, the trivalent ion is selected from the group consisting of: Al; and Fe. In a further embodiment, the effective amount of trivalent ion is from about 50 to about 1000 mg/l.

Cationic polymers, divalent ions, and trivalent ions can be added to the activated sludge via various routes.

In one embodiment, the cationic polymers are added to the activated sludge by adding said cationic polymers to an influent stream entering said MBR.

In another embodiment, the cationic polymers are added to the activated sludge by adding said cationic polymers to an anoxic tank of said MBR.

In yet another embodiment, the cationic polymers are added to the activated sludge by adding said cationic polymers to an aeration tank of said MBR or to a membrane tank of said MBR. A membrane tank means a tank that has a submerged membrane and has an aerator. An aeration tank has an aerator, but does not a have membrane inside the tank. The MBR of aeration tank has an external membrane.

The divalent ions, trivalent ions, or a combination thereof can be added at the same locations either sequentially or in combination with the cationic polymers.

With respect to the mechanism of how these polymers and ions are added to the MBR, there are many techniques available to those of ordinary skill in the art. For example, the cationic polymers are in drums, which are then poured into the MBR.

The methodologies of the present invention can be applied for MBR's that have either external or submerged membranes.

An MBR can be configured in various ways. As shown in FIG. 1, an MBR may be equipped with a submerged membrane. There is an influent stream (1), which enters the MBR containing an anoxic tank (3) and an aeration tank/membrane tank (4) that has a submerged membrane (5). The aeration tank/membrane tank has aerator (not shown). The membrane filtrate or effluent (7) exits the membrane (5). The activated sludge, which remains in the aeration/membrane tank (4), can be returned for further processing (6). One or more cationic polymers and/or divalent/trivalent ions (2) may be added to the influent stream (1), the anoxic tank (3), and the aeration/membrane tank (4).

Figure 2:
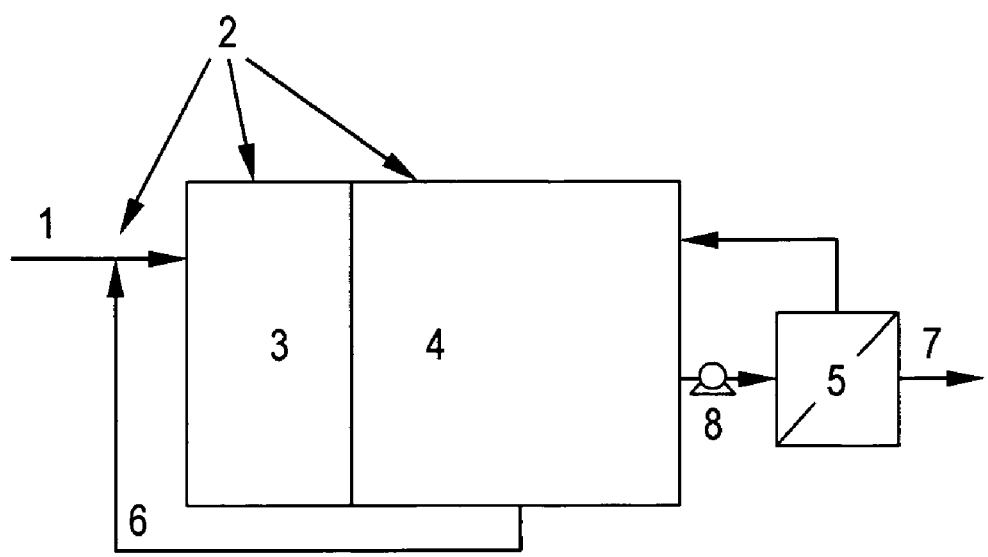
FIG. 2 shows a schematic of a membrane bioreactor containing an external membrane.

As shown in FIG. 2, an MBR may be equipped with an external membrane (5). There is an influent stream (1), which enters the MBR containing an anoxic tank (3) and anaeration tank (4). The aeration tank has aerator (not shown). A sludge circulation pump (8) is utilized to draw activated sludge into the external membrane (5). The membrane filtrate or effluent (7) exits the membrane (5). The activated sludge, which remains in the membrane tank (4), can be returned for further processing (6). One or more cationic polymers and/or divalent/trivalent ions (2) may be added to the influent stream (1), the anoxic tank (3), and the aeration tank (4).

The invention claimed is:

1. A method of conditioning an activated sludge in an MBR that treats industrial wastewater comprising: adding to said activated sludge an effective amount of one or more catiome polymers, wherein said polymers have a molecular weight of about 200,000 daltons or greater, and wherein said cationic polymers have a net cationic charge that ranges from about 5% to about 100% based on the number of monomers in said cationic polymers.

2. The method of claim 1 wherein said polymers are added to said activated sludge by adding said cationic polymers to an influent stream entering said MBR.

3. A method of conditioning an activated sludge in an MBR that treats industrial wastewater comprising: adding to said activated sludge an effective amount of one or more cationic polymers, wherein said polymers have a molecular weight of about 200,000 daltons or greater, wherein said polymers are added to said activated sludge by adding said cationic polymers to an anoxic tank of said MBR.

4. A method of conditioning an activated sludge in an MBR that treats industrial wastewater comprising: adding to said activated sludge an effective amount of one or more cationic polymers, wherein said polymers have a molecular weight of about 200,000 daltons or greater, wherein said polymers are added to said activated sludge by addition said cationic polymers to an aeration tank of said MBR or to a membrane tank of said MBR.

5. The method of claim 1, further comprising adding an effective amount of one or more divalent ions, one or more trivalent ions, or a combination thereof to the activated sludge.

6. The method of claim 1 wherein said cationic polymers contain monomers selected from the group consisting of: dimethylaminoethyl acrylate methyl chloride quaternary salt, dimethylaminoethyl acrylate methyl sulfate quaternary salt, dimethyamninoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylactylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl, methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, and diallyldimethyl ammonium chloride.

7. The method of claim 1 wherein said cationic polymers are selected from the group consisting of: DMAEA/MCQ; DMAEA/BCQ; DMAEM/MCQ; and DMAEM/BCQ; and polymers utilizing mannich reactions.

8. The method of claim 1 wherein said effective amount of cationic polymers is from about 3 to about 500 mg/L as actives.

9. A method of conditioning an activated sludge in an MBR that treats industrial wastewater comprising: adding to said activated sludge an effective amount of one or more cationic polymers, wherein said polymers have a molecular weight of about 200,000 daltons or greater; adding an effective amount of one or more divalent ions, one or more trivalent ions, or a combination thereof to the activated sludge, wherein said divalent ions are selected from the group consisting of: Ca and Mg.

10. The method of claim 5 wherein said trivalent ions are selected from the group consisting of: Al and Fe.

11. The method of claim 9 wherein said Ca ion is added to said MBR in the form selected from the group consisting of: $CaCl_2$;
$Ca(OH)_2$, $Ca(C_2H_3O_2)_2$, CaO, and hydrates thereof.

12. The method of claim 5 wherein said effective amount of divalent ions are from about 10 to about 500 mg/l.

13. The method of claim 5 wherein said effective amount of trivalent ions are from about 50 to about 1000 mg/l.

14. A method of improving flux through a membrane in an MBR that treats industrial wastewater comprising: adding to an activated sludge of said MBR an effective amount of one or more cationic polymers, wherein said polymers have a molecular weight of about 200,000 or greater, wherein said cationic polymers have a net cationic charge that ranges from about 5% to about 100% based on the number of monomers in said cationic polymers.

15. A method of reducing foaming of activated sludge in an MBR that treats industrial wastewater comprising: adding to an activated sludge of said MBR an effective amount of one or more cationic polymers, wherein said polymers have a molecular weight of about 200,000 daltons or greater, wherein said cationic polymers have a net cationic charge that ranges from about 5% to about 100% based on the number of monomers in said cationic polymers.

16. A method reducing fouling in an MBR that treats industrial wastewater comprising: adding to an activated sludge of said MBR an effective amount of one or more cationic polymers, wherein said polymers have a molecular weight of about 200,000 daltons or greater, wherein said cationic polymers have a net cationic charge that ranges from about 5% to about 100% based on the number of monomers in said cationic polymers.

17. The method of claim 9 wherein said Mg ion is added to said MBR in the form selected from the group consisting of: $MgCl_2$, $Mg(OH)_2$, $Mg(C_2H_3O_2)_2$, $MgSO_4$, $MgO$, and hydrates thereof.

\* \* \* \* \*